United States Patent
Boswell

[11] 4,048,628
[45] Sept. 13, 1977

[54] METHOD AND APPARATUS FOR ERASING SCATTERING IN STORAGE-TYPE LIQUID CRYSTALS BY FREQUENCY SWEEPING

[75] Inventor: Donald D. Boswell, Granada Hills, Calif.

[73] Assignee: Hughes Aircraft Company, Culver City, Calif.

[21] Appl. No.: 709,360

[22] Filed: July 28, 1976

[51] Int. Cl.² .................. G02F 1/00; G11C 11/42; G11C 7/00
[52] U.S. Cl. .................. 340/173 LM; 340/173 LT; 340/324 M; 350/160 LC
[58] Field of Search ..... 340/173 LM, 173 R, 173 LT, 340/166 EL, 336, 324 M; 350/160 LC

[56] References Cited
U.S. PATENT DOCUMENTS

| | | | |
|---|---|---|---|
| 3,655,269 | 4/1972 | Heilmeier | 340/324 M |
| 3,921,162 | 11/1975 | Fukai et al. | 340/336 X |

Primary Examiner—Stuart N. Hecker
Assistant Examiner—Donald McElheny
Attorney, Agent, or Firm—G. B. Wood; W. H. MacAllister

[57] ABSTRACT

Methods and apparatus for erasing the stored scattering image in storage-type liquid crystal light valves. Erasure is accomplished by applying a signal from an erasing signal source across the liquid crystal cell where the signal is a voltage which is swept over the audio frequency range of 1 KHZ through 20 KHZ. In another embodiment, the erasing signal source supplies a precursor signal which has an initial frequency below the frequency threshold for scattering. This low frequency signal is maintained for a brief period of time to excite the entire liquid crystal cell into a uniform scattering state. The erasing signal is then swept over the audio frequency spectrum of 1 KHZ through 20 KHZ to cause the cell to return to the non-scattered, translucent state.

9 Claims, 6 Drawing Figures

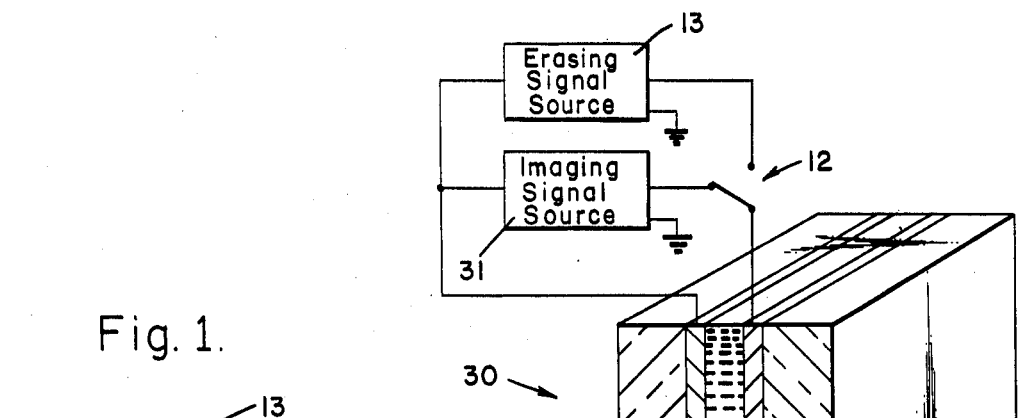
Fig. 1.
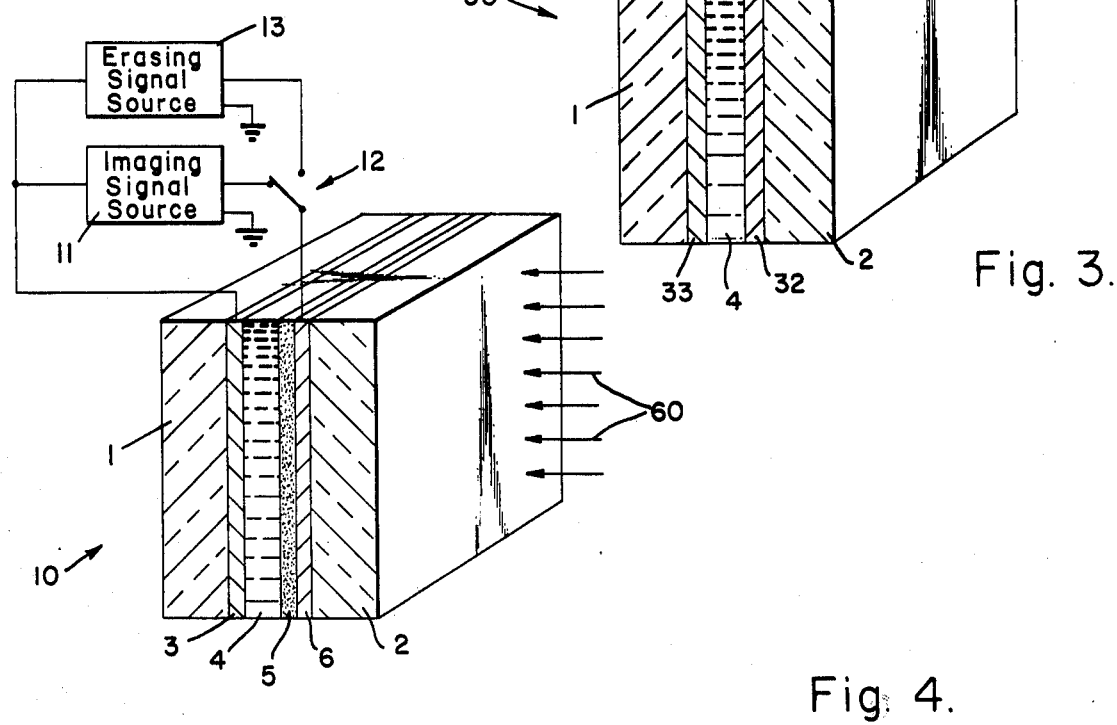
Fig. 3.
Fig. 4.
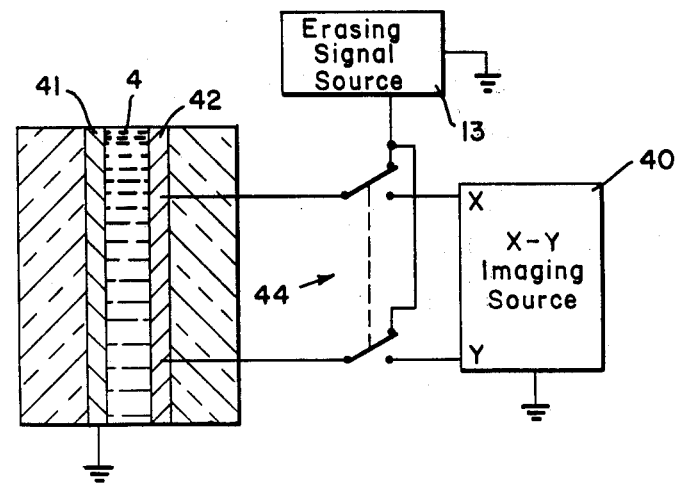

METHOD AND APPARATUS FOR ERASING SCATTERING IN STORAGE-TYPE LIQUID CRYSTALS BY FREQUENCY SWEEPING

BACKGROUND OF THE INVENTION

1. Field of the Invention

The present invention relates to methods and apparatus for erasing the image stored in storage-type liquid crystal devices and more particularly transforming scattered regions in storage-type liquid crystal cells to the non-scattered state.

2. Description of the Prior Art

Liquid crystal light valves whose light transmissivity in selected areas can be varied in response to a voltage, current, electric field, magnetic field, electron beam, a light beam or other external stimuli are well known. In such devices, a sufficient stimulus applied to a liquid crystal in a normally transparent state will cause light scattering to occur. By selectively stimulating portions of the liquid crystal an image can be produced.

Many liquid crystal compounds are available for use in liquid crystal light valve devices where a thin liquid crystal film is interposed between two retaining plates. Devices using nematic type liquid crystals, for example, generally sustain light scattering only while the external stimulus is being applied. Such liquid crystals spontaneously return to the non-scattered state within a relatively short time after the stimulus is removed. Scattering of this type is called "dynamic scattering." In other types of liquid crystal compounds, for example a nematic liquid crystal doped with about 10% cholesteric liquid crystal, spontaneous return to the normal state either does not occur at all or occurs very slowly thereby allowing retention of an image for a long period of time after the stimulus is removed. Thus, it's clear that in storage-type liquid crystals not only must a stimulus be applied to cause a transition from a nonscattering to a scattering state but an additional stimulus must be applied to cause the reverse transition from the scattering to the non-scattering state. The scattering in this type of liquid crystal device is called "emulsion scattering storage."

In general, the characteristics of the field required to induce transitions between the scattered and non-scattered state in storage-type liquid crystals are dependent upon the composition of the liquid crystal material and the geometric characteristic of the device. However, for a transition from a non-scattering to scattering state to occur, the imaging signal must have an amplitude above an amplitude threshold and a frequency below a maximum scattering frequency (scattering frequency thereshold). On the other hand, erasing requires, at the least, application of a signal having an amplitude above the amplitude threshold and a frequency greater than the maximum scattering frequency. Thus, in the present application the amplitude threshold refers to the dc or rms ac signal amplitude required to cause a transition from one scattering state to another, i.e., either to store an image or to erase a stored image. Further, the maximum scattering frequency is the highest frequency at which scattering will occur in the liquid crystal if the voltage amplitude is above the amplitude threshold. A frequency below the maximum scattering frequency will cause scattering to occur while a frequency above the maximum scattering frequency will tend to cause erasure, i.e., restoration to the transparent state of the liquid crystal.

One problem in liquid crystal devices in which emulsion scattering storage occurs is erasing the image stored and thus returning the device to the non-scattered translucent state. The most effective method has been to apply an audio frequency (~10–20KHZ) ac voltage having an amplitude of about 50–80 vrms across the liquid crystal film until the scattering centers break up and disappear. For example, in U.S. Pat. No. 3,642,348, a method is disclosed whereby transformation from the Grandjean or scattered state to the focalconic or non-scattered state is produced in specific regions of the liquid crystal film by the application of an ac voltage. However, using such an erasing technique is relatively slow since the erasing is not completed until the scattering centers break up and disappear. This may take from 1 to 30 seconds. Furthermore, the utilization of such methods frequently leaves areas where incomplete erasure has occured resulting in a "ghost" image.

Consequently, it is a general object of the present invention to provide apparatus and methods of erasing a stored image from a storage-type liquid crystal cell by stimulating the liquid crystal material to transform from the scattered to the non-scattered state.

Another object of the present invention is to provide methods for erasing the stored scattering centers more rapidly.

Yet another object of the present invention is to provide methods and apparatus to accomplish a more complete erasure and thereby more completely eliminate stored scattering centers.

SUMMARY OF THE INVENTION

The apparatus of the present invention comprises a signal source for supplying a variable audio frequency voltage having an approximately constant amplitude across a liquid crystal film in a typical storage-type liquid crystal cell. By supplying a voltage which sweeps in frequency from approximately 1 KHZ through 20 KHZ, erasure of the stored scattering centers in the liquid crystal is accomplished in about one half the time of previous techniques. In a second embodiment of the present invention a more complete erasure can be accomplished by initially applying a precursor signal having a frequency lower than the maximum scattering frequency. A brief pause (approximately one hundred milliseconds) at this low frequency will cause the cell to be completely excited into the scattering state thereby creating new scattering centers in those regions where the cell contained none. Thus, the image that will be erased by the frequency swept voltage is transformed into a uniform scattering region over the entire cell. The erasing signal source then supplies a voltage which sweeps in frequency from a first frequency, preferably below the maximum scattering frequency, through a second frequency above the maximum scattering frequency and preferably the maximum audio frequency. The result is a faster, more complete and more uniform erasure of a stored image than has heretofore been possible.

BRIEF DESCRIPTION OF THE DRAWINGS

A complete understanding of the present invention and of the above and other objects and advantages thereof may be gained from a consideration of the following description of the preferred embodiments taken in conjunction with the accompanying drawings in which:

FIG. 1 is a partial perspective partial schematic of a photoactivated storage-type liquid crystal light valve incorporating a typical swept frequency erase system.

FIG. 3 is a partial perspective partial schematic of a storage-type liquid crystal light valve incorporating a typical swept frequency erase system.

FIG. 4 is a partial schematic partial perspective of a storage-type liquid crystal light valve having X-Y address imaging and incorporating a typical swept frequency erase system.

DESCRIPTION OF THE PREFERRED EMBODIMENTS

Figure 2:
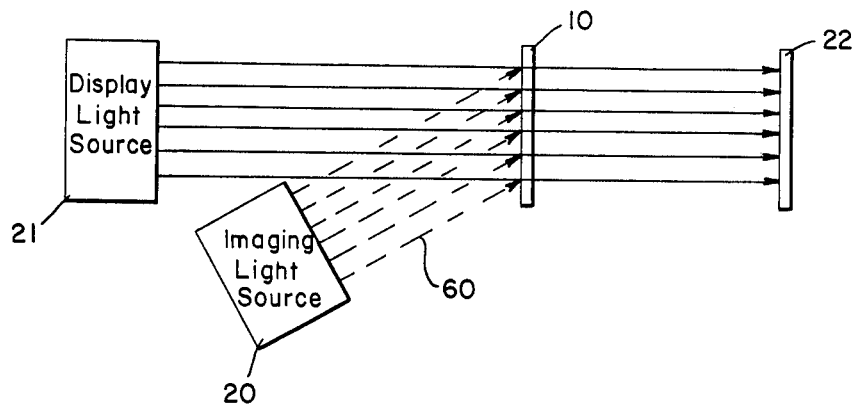
FIG. 2 is a representation of a direct imaging system utilizing the liquid crystal light valve of FIG. 1.

Although the present apparatus and method may be applied to and practiced in liquid crystal devices utilizing any of the many types of imaging techniques applicable to storage-type liquid crystal devices, the present invention may be most easily illustrated in its application to liquid crystal devices utilizing photoactivated imaging.

The photoactivated liquid crystal cell 10 depicted in FIG. 1 comprises a storage-type liquid crystal layer 4 sandwiched between a first transparent conductive electrode 3 adjoining or deposited on a first transparent plate 1, and a second transparent conductive electrode 6 adjoining or deposited on a second transparent plate 2, and a transparent photoconductor 5 between second conductive electrode 6 and liquid crystal layer 4. The imaging signal source 11 and swept frequency erasing signal 13 are coupled to electrodes 3 and 6 so that imaging and erasing signals may be selectively applied in response to the switching of switch 12.

In a representative embodiment, the electrodes 3 and 6 may be idium tin oxide (ITO), tin oxide or some other suitable transparent electrode and the transparent plates 1 and 2 may be glass or plastic. For the photoconductor 5, zinc sulfide (ZnS), cadmium sulfide (CdS) or some other suitable material may be used. A Cds photoconductor film may be from about 1 micrometer to 12 micrometers in thickness, with 5 micrometers thick films performing best while the ZnS photoconductor films may vary from about 0.5 micrometers to 1 micrometer in thickness.

The liquid crystal material may be any one of a number of storage-type liquid crystals such as those disclosed by Haas el al, in U.S. Pat. No. 3,680,950, Wysocki et al, in U.S. Pat. No. 3,642,348, or Wysocki et al, in U.S. Pat. No. 3,652,148, so long as the liquid crystal remains in a scattering state (i.e., retains the image) for a substantial period of time after the imaging impetus has been removed. As a more specific example, utilization of compounds comprising 8 to 10% cholesteric liquid crystal and 90 to 92% nematic dynamic scattering mode (DSM) type liquid crystals result in devices in which an applied imaging signal produces long-term light-scattering, i.e., emulsion scattering storage. Smaller amounts of cholesteric additive give a fading emulsion scattering storage. The initial resistivity, the threshold field for scattering, the current levels, and power consumption, as well as the response time, amplitude, and decay time for scattering all vary with the composition (e.g., chemical structure and dopants) of the liquid crystal material used. The liquid crystal film 4 may vary from 6 to 25 micrometers with a 12 micrometer thick film preferable. The aperture areas of typical cells are from 1 to 6 $cm^2$ but larger cells can be made with little difficulty.

For imaging to occur in photoactivated liquid crystal cells such as that shown in FIG. 1, the electrical properties of the liquid crystal 4 and the photoconductor 5 must be properly matched so that the signal applied to electrodes 3 and 6 does not conduct current having a value above the amplitude thereshold unless the photoconductor is optically activated. Thus, effective dark resistivity of the photoconductor layer must be higher than that of the liquid crystal layer while its photoactivated resistivity should be lower than that of the liquid crystals. Other factors must also be matched. For example, the threshold voltage, the operating voltage and the operating current for effective scattering behavior must be consistent with the capabilities of the activated photoconductive layer. Also, the optical absorptance of the liquid crystal must not interfere with the photoactivation. Thus, if the imaging light passes through the liquid crystal before impinging upon the photoconductor, then the liquid crystal should not absorb appreciably at the activating wavelength. The liquid crystal layer, which may be in a non-scattered or transparent state, changes state in response to an appropriate imaging current from imaging signal source 11.

In operation, imaging signal source 11 supplies a signal which may be ac, dc, or a combination of ac and dc, to cause an image to be stored in the liquid crystal layer. For highest operating efficiency, it is preferably to apply an ac voltage superimposed on a dc bias where the dc bias supply voltage is typically from about 5 to 50 volts to supply a current density on the order of 1 to 10 $\mu A/cm^2$ with a like amount of ac.

Referring to FIG. 2, a simplified representation of a direct imaging scheme using a photoactivated liquid crystal light valve is shown comprising the liquid crystal cell 10 shown in FIG. 1, an imaging light source 20 for imposing an imaging light 60 on the liquid crystal cell 10, a display light source 21 and a screen 22 for projecting the image stored in the storage type liquid crystal light valve 10.

The thin photoconductive layer incorporated between the liquid crystal and one of the electrodes in a typical sandwich-type cell arrangement provide the means for creating the field necessary to cause scattering to occur. In FIG. 1, a signal is applied to the electrodes 3 and 6 but the high resistivity photoconductive layer 5 prevents current passing through the liquid crystal layer 4 from exceeding the amplitude threshold. However, when a spot on the photoconductive layer is activated optically by an imaging light 60 (e.g., by ultraviolet light), the voltage in the area of the activated spot becomes applied to the liquid crystal and immediately produces an image by causing emulsive scattering storage to occur just in this area. Cells with transparent electrodes, such as the one shown schematically in FIG. 1, can thus be placed directly in the image plane of a projection system as shown in FIG. 2.

For example, ultraviolet sensitive photoconductors, such as zinc sulfide, can be used so that the cells are not sensitive to visible light. Thus, an image can be recorded with ultraviolet light and viewed or displayed with visible light.

Once the image is stored on the liquid crystal film 4, the switch 12 is utilized to deactivate the imaging signal. When it is desired to erase the stored image, switch 12 is switched to enable the frequency swept erasing signal source 13 to supply the necessary swept frequency signal between conductive electrodes 3 and 6.

Figure 5A:
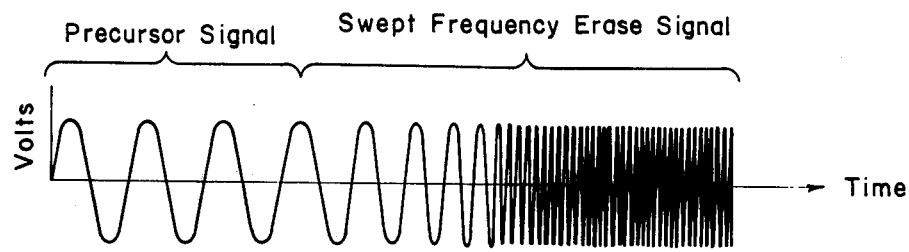
FIGS. 5a and 5b show waveforms for a typical erase signal with and without the low frequency precursor signal respectively.
Figure 5B:
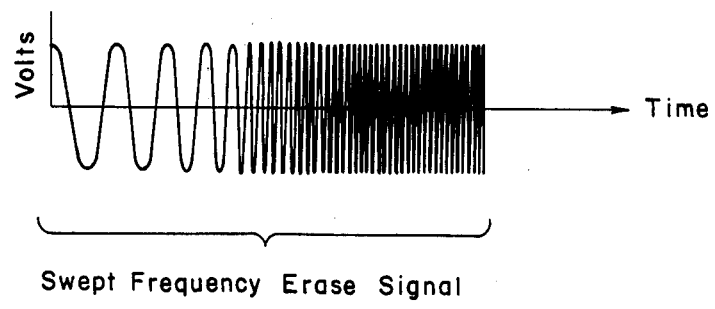

The method of erasing a stored image from a storage-type liquid crystal cell such as the one described in FIG. 1, may be understood by reference to FIGS. 5a and 5b. Utilizing the aforementioned apparatus, an image is first stored on the storage-type liquid crystal cell by switching switch 12 so that imaging signal source 11 may supply the voltage necessary for the imaging light 6 from imaging light source 20 to be impressed upon the liquid crystaL cell. Once the image has been impressed upon the cell, the imaging singal source and the imaging light may be removed. At a later time, when it is desired to return the light crystal cell to the non-scattered state, the image is erased by first closing switch 12 to allow erasing signal source 13 to supply the necessary erasing signal illustrated in FIG. 5b. The erasing signal is then applied uniformly across the liquid crystal layer. Of course, it will be appreciated that the erasing signal may be applied to selected portions of the liquid crystal cell to erase less than the entire liquid crystal layer in some arrangements.

The characteristics of the erasing signal are critical. For the present invention it is necessary that the signal sweep in frequency from a frequency preferably below the maximum scattering to a frequency in the audio frequency range above the maximum scattering frequency as illustrated in FIG. 5b. While it is preferable for the erasing signal to sweep from about 1 KHZ to 20 KHZ, erasing may occur by sweeping over a smaller frequency spectrum in the audio frequency range. However, as the range over which the frequency sweep occurs decreases the effectiveness and completeness of the erase also decreases. Furthermore, the voltage amplitude of the erasing signal must be above the amplitude threshold, that is, that mimimum voltage which will initiate either scattering or erasure of the liquid crystal cell depending upon the frequency of the signal applied. While it is preferable to maintain a constant voltage during the sweep time, the amplitude may vary without significantly degrading the effectiveness of the erase so long as the amplitude is above the amplitude threshold. Generally, the sweep in frequency from 1 KHZ to 20 KHZ may occur in as little as 0.1 seconds. However, this time may vary depending upon the characteristic of the liquid crystal cell, the characteristics of the liquid crystal compound itself and other factors. The erasure becomes less effective as the sweep time is decreased below this minimum. Nevertheless, it has been discovered that the effective sweep time to obtain essentially complete erasure is generally less than half the time required if the conventional constant voltage high frequency signal is applied.

An improved erasing method to achieve a more complete erasure involves the initial addition of a precursor signal as illustrated in FIG. 5a. The amplitude of this precursor signal is approximately the same as the swept frequency erase signal and thus is above the amplitude threshold of the cell. In addition, the precursor signal has a frequency which is below the maximum scattering frequency. By applying this precursor signal for a short duration before the application of the swept frequency erase signal, the molecules in the liquid crystal cell will be completely excited, thereby creating new scattering centers in those regions where the cell previously contained none. Thus, the image to be erased by the frequency swept voltage is a uniform scattering region.

Since the objective is to cause scattering to occur over the entire cell area to be erased, the duration of the precursor signal should be sufficient to cause substantial uniformity of scattering over the entire liquid crystal cell. For the particular compound used for the liquid crystal in the present embodiment, namely 8 to 10% cholesteric and 90 to 92% nematic liquid crystal material, the precursor signal had a duration of approximately one hundred milliseconds. Once the liquid crystal cell is in a uniform scattering state, the swept frequency erase signal previously described may be applied. Thus, by first causing the cell to be uniformly scattered and then erasing the entire liquid crystal cell with the swept frequency erase signal, incomplete erasure and ghosting can be eliminated.

While erasure of the entire liquid crystal cell will occur when the erasing signal is applied to both scattering and non-scattering portions of the liquid crystal light valve, it will be appreciated, that the erasing signal may be impressed on only selected portions of the liquid crystal by limiting the size or configuration of the electrodes or the areas in which the liquid crystal material is placed in electric field relationship to the electrodes.

Although the above description of the present invention has been illustrated as it applied to a photoactivated liquid crystal light valve, the present invention applies to storage-type liquid crystals utilizing other imaging techniques as well.

Referring to FIG. 3, for example, a simple storage-type light valve structure 30 for regulating the passage of light is shown comprising transparent plates 1 and 2, liquid crystal layer 4, swept frequency erasing electrodes 32 and 33 (which also serve as imaging electrodes), "on-off" signal source 31 and swept frequency erasing signal source 13. An appropriate scattering signal from scattering signal source 31 applied across electrodes 33 and 32 induces a transition from the non-scattering to the scattering state. The liquid crystal cell may be returned to the non-scattered state at a subsequent time after the imaging signal is removed by the application of an appropriated swept frequency erase signal from swept frequency erasing signal source 13.

In FIG. 4, another liquid crystal light valve is shown having a X-Y addressable imaging scheme wherein a field may be generated between electrodes 41 and 42 in response to an imaging signal selectively applied to the X-Y address grid electrodes 42 by X-Y imaging source 40. Thus, selected regions of the liquid crystal layer 4 may be transformed from the non-scattered state to the scattered state. When the imaging signal from X-Y imaging source is removed, the image remains since the liquid crystal film is the storage-type liquid crystal. To erase the stored image, the swept frequency signal source 13 supplies, via the closing of switch 44 for example, an appropriate erasing signal to all X-Y address lines simultaneously to achieve rapid and complete erasure of the entire liquid crystal surface. It will be appreciated that the erasing signal may be applied to a selected few of the X-Y address lines to erase only selected portions of the liquid crystal device with the addition of appropriate addressing means to the erasing signal source 13.

It will also be appreciated that other imaging schemes may be utilized to practice the present invention so long as swept frequency erasing signal can be impressed across the liquid crystal layer.

In addition, the liquid crystal device may be reflective or transmissive without departing from the spirit of the present invention. Finally, the erasing electrodes in the various embodiments may serve the dual function of imaging and erasing or may be separate electrodes.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

What is claimed is:

1. An improved storage-type liquid crystal cell comprising a storage-type liquid crystal layer and imaging means for causing emulsive storage scattering to occur in selected regions of the liquid crystal cell, the improvement comprising means for applying a swept frequency erasing signal across at least one selected region of the liquid crystal layer.

2. The storage-type liquid crystal cell of claim 1 wherein said means for applying a swept frequency swept signal comprises:
   a. a first electrode interposed on one side of the liquid crystal layer;
   b. a second electrode interposed on the opposite side of the liquid crystal layer, said first and second electrodes in electric field influencing relationship with said liquid crystal layer; and
   c. a swept frequency erasing signal source coupled to said first and second conductors to provide an image erasing signal between said first and second electrodes in said liquid crystal cell.

3. The storage-type liquid crystal cell of claim 1 wherein said swept frequency erasing signal has an rms amplitude threshold of the liquid crystal layer and a variable frequency in the audio frequency range which sweeps continuously from a first frequency to a second frequency higher than said first frequency.

4. The storage-type liquid crystal cell of claim 1 wherein said swept frequency erasing signal has a rms amplitude above the amplitude threshold of the liquid crystal layer and a variable frequency in the audio frequency range which comprises:
   a. a precursor signal having a frequency below the frequency threshold of the liquid crystal layer to generate uniform scattering across the liquid crystal layer, and
   b. an erase signal which sweeps continuously from a first frequency to a second frequency higher than said first frequency.

5. A method for causing transformation from the scattered to the non-scattered state in a storage-type liquid crystal cell having a storage-type liquid crystal layer comprising the step of applying a swept frequency erasing signal across the liquid crystal device said signal having a rms amplitude above the amplitude threshold of the liquid crystal layer and a variable frequency in the audio frequency range which sweeps continuously from a first frequency to a second frequency high than said first frequency wherein said second frequency is above the maximum scattering frequency of the liquid crystal cell.

6. The method for causing transformation from the scattered to non-scattered state in a storage-type liquid crystal cell having a storage-type liquid crystal layer said method comprising the steps of:
   a. applying a precursor signal having an amplitude above the amplitude threshold of the liquid crystal cell at a frequency below the frequency maximum scattering, and
   b. secondly, applying an erasing signal across the liquid crystal device said signal having a rms amplitude above the amplitude threshold of the liquid crystal layer and variable frequency in the audio frequency range which sweeps continuously from a first frequency to a second frequency higher than said first frequency wherein said second frequency is above the maximum scattering frequency of the liquid crystal cell.

7. The method of claim 6 wherein the precursor signal is applied for a duration of time sufficient to cause uniform scattering throughout the region of the liquid crystal cell to which the precursor signal is applied.

8. The method of claim 6 wherein the first frequency is about 1 KHZ and the second frequency is about 20 KHZ.

9. The method of claim 6 wherein the frequency of the precursor signal is substantially equal to said first frequency of the erasing signal.

* * * * *